United States Patent [19]

Thompson

[11] 4,079,475
[45] Mar. 21, 1978

[54] PROCESS FOR MANUFACTURING AN INTERNALLY CAST OR MOLDED SINGLE THREADED PRODUCT

[75] Inventor: Keith Thompson, Dollard des Ormeaux, Canada

[73] Assignee: Coats & Clark, Inc., Stamford, Conn.

[21] Appl. No.: 775,734

[22] Filed: Mar. 9, 1977

[51] Int. Cl.² .................. B29D 1/00; B22D 27/10
[52] U.S. Cl. .................. 10/86 R; 164/113; 164/131; 164/347; 249/59; 425/441
[58] Field of Search .............. 10/86 R, 86 F; 249/59; 425/441; 164/113, 131, 347

[56] References Cited

U.S. PATENT DOCUMENTS

| | | | |
|---|---|---|---|
| 2,133,019 | 10/1938 | Campbell | 249/59 |
| 3,150,222 | 9/1964 | Blaustein et al. | 425/441 X |
| 3,926,401 | 12/1975 | Northup | 249/59 |

FOREIGN PATENT DOCUMENTS 601,189  7/1960  Canada .................. 10/86 R

Primary Examiner—E. M. Combs
Attorney, Agent, or Firm—Burgess, Ryan and Wayne

[57] ABSTRACT

A process for casting or molding a single internal thread at the same time that the desired product is cast or molded. The desired thread configuration is defined by two aligned and abutting identical core pins. Each of the pins has a protruding portion in the shape of a helical ramp extending through an angle of less than 360°. The ramp has an outer diameter and pitch corresponding to the diameter and pitch of the desired internally threaded surface to be formed. The protruding portion of each core pin includes a vertically oriented surface extending between the ends of the ramp. A peripheral edge groove extending along the outer edge of the ramp defines the desired thread configuration. The aligned core pins are placed within a recess formed by mating portions of a die block to define the shape of the desired product. A hardenable fluid is introduced into the spaces between the die blocks and the core pins, and hardened to produce the desired product, after which the die blocks and core pins are separated to permit removal of the product therefrom.

7 Claims, 8 Drawing Figures

PROCESS FOR MANUFACTURING AN INTERNALLY CAST OR MOLDED SINGLE THREADED PRODUCT

This invention relates to a process for manufacturing an internally cast or molded single threaded product, as well as to apparatus utilized in said process, and products made by said process.

Products having a single internal thread are commonly employed as panel nuts, clamp nuts, thumb nuts, wing nuts, potentiometer lock nuts, and for similar purposes. Other uses of products having single internal threads are readily apparent to those skilled in the art.

Although all of the products mentioned in the previous paragraph are nuts, i.e. they are designed to be threaded onto a shaft having corresponding external threads, the external surfaces of said single threaded products may be of any desired configuration.

Heretofore, it has been common to form such internally single threaded products by casting or molding techniques, in which the product itself is cast or molded with a cylindrical hole therein, and thereafter a tap is utilized (in a separate manufacturing operation) to cut the desired internal thread therein. This prior art process, however, requires a separate tapping operation involving insertion of a tap into the hole to be threaded, turning the tap into the hole to cut the desired thread, and subsequently removing the tap by unthreading it from the hole. Such a step involves additional time and labor, and increases the manufacturing cost of such internally threaded products.

Accordingly, an object of the present invention is to provide an improved process for manufacturing an internally cast or molded single threaded product.

As herein described there is provided a process for manufacturing an internally cast or molded single threaded product, comprising the steps of: providing first and second contiguous opposed die blocks, each block having a recess therein, said recesses cooperating to define a space having the desired shape of the exterior surface of said product; disposing first and second aligned core pins within said first and second die blocks respectively, each pin having a protruding portion extending into the recess of the corresponding die blocks, each said protruding portion comprising a helical ramp having an outer diameter and pitch corresponding to the desired diameter and pitch of an internally threaded surface to be formed within said product, said ramp extending through a circumferential angle of less than 360°, said protruding portion including a vertically oriented parting line shut off surface extending between the ends of said ramp, the outer edge of said ramp having a peripheral edge groove therein, said groove extending along the edge of said ramp except in the vicinity of said vertically oriented surface, said ramp having first and second shoulder portions extending between said vertically oriented surface and the ends of said groove, the protruding portions of said core pins being disposed so that the ramps thereof are in abutting relationship with the grooves of said ramps communicating with each other to form a space defining the shape of the internal thread to be formed on said surface; introducing a hardenable fluid within the spaces between said die blocks and said core pins; causing said fluid to harden; separating said first core pin and first die block from said second core pin and second die block; and removing the hardened material from said spaces.

According to another aspect of the invention there is provided an internally cast or molded single threaded product manufactured by the aforementioned process.

According to still another aspect of the invention there is provided a core pin for use in manufacturing an internally cast or molded single threaded product, said core pin comprising; a core body; a protruding portion extending from said core body and comprising a helical ramp having an outer diameter and pitch corresponding to the desired diameter and pitch of an internally threaded surface to be formed within said product, said ramp extending through a circumferential angle of less than 360°, said protruding portion including a vertically oriented parting line shut off surface extending between the ends of said ramp, the outer edge of said ramp having a peripheral groove therein, said groove extending along the edge of said ramp except in the vicinity of said vertically oriented surface, said ramp having first and second shoulder portions extending between said vertically oriented surface and the ends of said groove.

The invention will be more clearly understood by reference to the following detailed description in conjunction with the accompanying drawings, in which:

FIG. 2b shows a right end view of the core pin insert of FIG. 2a;

FIG. 3 shows an enlarged view of a portion of FIG. 2a;

FIG. 1 shows a die cast nut 10 having a single internal thread 11, said nut and integral thread having been manufactured by the process of the invention.

Figure 1:
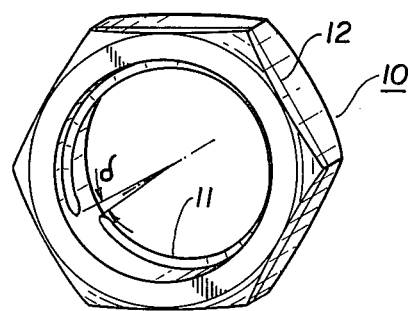
FIG. 1 shows a nut having a single internal thread, manufactured by the process of the invention.

The die case nut 10 has a hexagonal periphery, and planar opposing major faces with an internal hole adjacent the thread 11. The thread 11 has a helical configuration, and extends through a circumferential angle of less than 360°, with an angular space δ on the order of 5 to 15°. The ends of the thread 11 are vertically separated, i.e. separated in a direction extending between the major faces of the nut 10, by a distance equal to the desired thread pitch, and the diameter of the thread 11 corresponds to the diameter of the shaft with which said thread is to be compatible. In one embodiment of the invention which was actually manufactured, a ⅜-32 nut was produced having a pitch of 0.0315 inches and major and minor thread diameters of 0.379 inch and 0.348 inch respectively.

In the casting process, an allowance for material shrinkage (0.007 inch/inch for die cast zinc) during the curing process should be made in the die design to provide a product meeting industry tolerance standards.

Since the nut 10 is die cast utilizing two mating die casting blocks, a thin flash line 12 appears on the periphery of the nut at a position corresponding to the meeting plane of said blocks. Preferably, the flash line 12 is displaced toward one or the other of the major surfaces of the nut, so as to minimize interference with any wrench utilized to turn the nut.

The internal thread 11 of the nut 10 is formed by two identical abutting core pins 13 and 14 (see FIG. 6), one of said pins being shown in FIGS. 2a, 2b, 3 and 4. As shown in these figures, each core pin comprises a body portion 15 and a protruding portion 16. The rear end surface of the body portion 15 has an internally threaded hole 17 for receiving a retainer bolt. The periphery of the body portion 15 is circular.

The protruding portion 16 of each of the core pins 13, 14 comprises a helical ramp 18, which has an outer diameter and pitch corresponding to the diameter and pitch of the thread 11 to be formed.

Preferably, but not necessarily, there is a central hole 19 through a protruding portion 18 of the core pins 13 and 14, oriented in a direction substantially perpendicular to the surface of the ramp 18. The hole 19 eliminates the necessity for maintaining close tolerances on the central portions of the ramps 18 of the core pins 13 and 14 to permit said core pins to accurately mate with each other. This permits the core pins 13 and 14 to be manufactured at lower cost than would otherwise be possible, with no corresponding deterioration in performance.

Figure 2A:
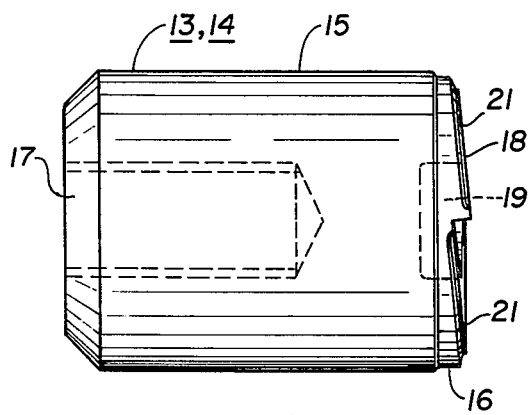
FIG. 2a shows a side view of a core pin insert employed in practicing the process of the invention.
Figure 2B:
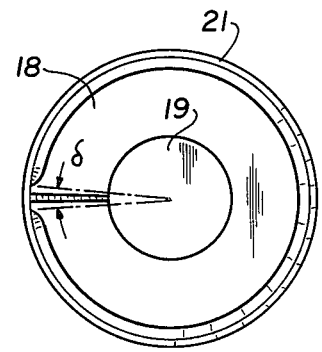
Figure 4:
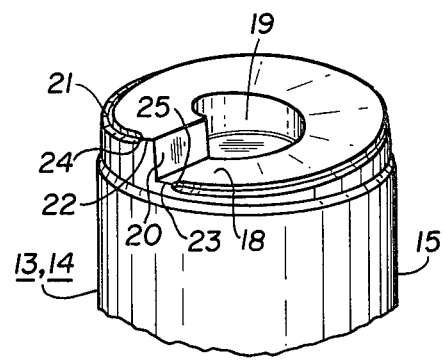
FIG. 4 shows a perspective view of the protruding portion of the core pin insert shown in FIGS. 2a, 2b and 3.
Figure 5:
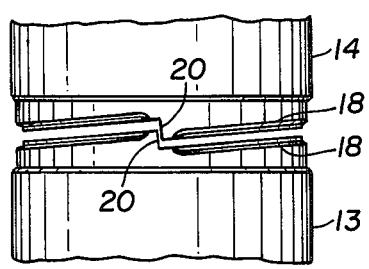
FIG. 5 shows a partial perspective view of the adjacent mating ramp portions of two core pins of the type shown in FIGS. 2a, 2b, 3 and 4, with said pins slightly displaced from each other.

As shown most clearly in FIGS. 2b and 4, the ramp 18 extends through an angle of less than 360 degrees, leaving a small angular portion δ on the order of 3° – 15° unoccupied. A vertically oriented parting line shut off surface 20 extends between the ends of the ramp 18. The outer edge of the ramp 18 has a peripheral edge groove 21 therein extending along the edge of the ramp except in the vicinity of the vertically oriented surface 20.

The ramp 18 has first and second shoulder portions 22 and 23 extending between the vertically oriented surface 20 and the ends 24 and 25 of the groove 21. As most clearly shown in FIG. 3, the surface 20 is inclined at an angle $\theta$ with respect to the center line or axis 26 of the corresponding core pin (said angle being known as the die fit angle) on the order of 5°. This angle facilitates separation of the core pins 13 and 14 after the desired nut 10 has been die cast.

Figure 3:
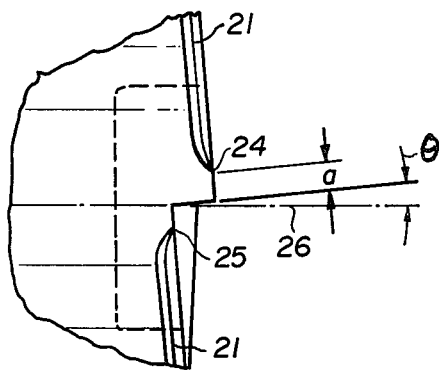

Also, as indicated in FIG. 3, the width $a$ of each of the shoulder portions 22 and 23 is at least 0.010 inches, to provide sufficient structural strength so that the shoulder portions are not likely to break off during normal operation.

Figures 6, 7:
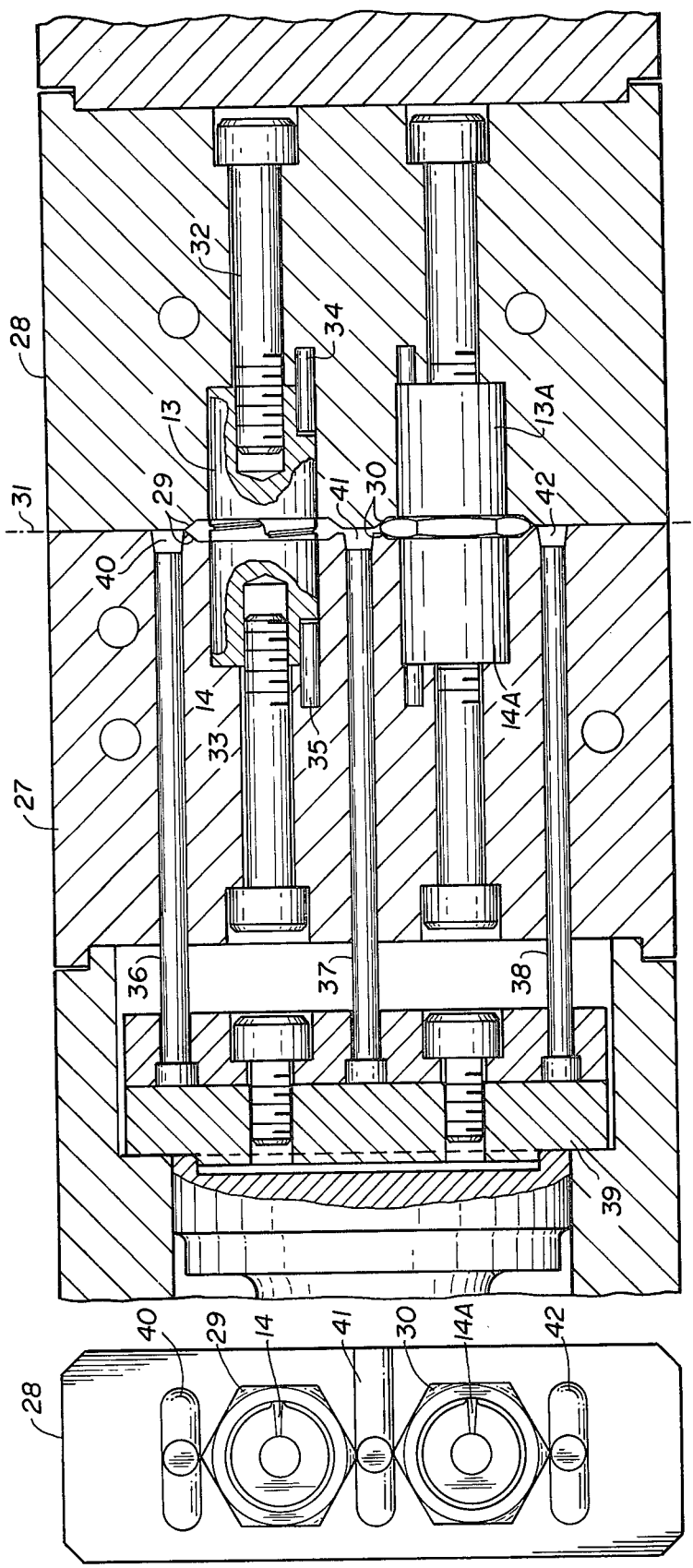
FIG. 6 is a side cross sectional view of a die casting apparatus for carrying out the process of the invention.
FIG. 7 is a right side view of the apparatus of FIG. 6.

To manufacture the nut 10, the die blocks 27 and 28 are provided as shown in FIGS. 6 and 7. Each die block has two recesses 29 and 30 therein which, when the die blocks are contiguous with each other along the parting line 31 – 31, cooperate to define spaces having the desired shape of the exterior surface of the nut 10. As previously indicated, the recesses 29 and 30 may be asymmetrical, i.e. a larger portion of each composite recess is situated within the die block 27 and a smaller portion within the die block 28, to produce a resulting flash line which is nearer one major face of the manufactured nut 10 than the other major face thereof. This asymmetrical arrangement is not absolutely necessary, and a symmetrical arrangement of the recesses 29 and 30 can be employed if good die maintenance is provided.

Each of the die blocks 27 and 28 is also provided with two circular apertures communicating with the recesses 29 and 30, to receive corresponding core pins. Thus, two of the nuts 10 may be manufactured in a single die casting operation using the apparatus shown in FIGS. 6 and 7.

The core pin 13 is retained within the die block 28 by means of a retaining bolt 32, and the core pin 14 is similarly retained within the die block 27 by means of a retaining bolt 33. Locking pins 34 and 35 extend into corresponding apertures in the core pins 13 and 14 and the die blocks 28 and 27 respectively to prevent rotation of the core pins with respect to their corresponding die blocks.

Ejector pins 36, 37 and 38 extend from the backing plate 39 through the die block 27 to points adjacent the gates 40, 41 and 42 which feed the die casting metal to the recesses 29 and 30.

FIG. 7 shows a right side view of the die block 27 from which the relationship between the gates 40, 41 and 42, the recesses 29 and 30, and the core pins 14 and 14A will be clear.

To perform a casting operation, the die blocks 27 and 28 are placed in contiguous arrangement, as shown in FIG. 6, with the ramps 18 of the protruding portions 16 of the core pins 13 and 14 (and 13A and 14A) being in abutting relationship, so that the grooves 21 of said core pins communicate with each other to form a space defining the shape of the desired internal thread 11 to be formed.

A die casting metal, such as zinc, is then introduced into the recesses 29 and 30 via the gate 41 (excess metal being removed via the overflow channels or gates 40 and 42) and allowed to harden to form the desired nuts 10. First die block 28 is moved away from die block 27, leaving nuts 10 attached to gates 40, 41 and 42, said gates retaining nuts 10 within die block 27. Then the die block 27 is moved backwards away from the center line 31, while maintaining the backing plate 39 immobile, so that the ejector pins 36, 37 and 38 push against the gates 40, 41 and 42 to eject the nuts 10 from the recesses 29 and 30. Thereupon the die blocks 27 and 28 are returned to their abutting relationship for another die casting operation.

While only two casting cavities are shown in the die blocks 27 and 28 for the sake of simplicity, any desired number of cavities can be provided, the number of parts that can be produced in one shot being limited only by the die size and the casting machine shot capacity.

The apparatus shown in FIG. 6, or similar apparatus, may also be utilized to manufacture nut 10 of a plastic material by injection molding. Alternatively, other casting or molding processes may be employed.

In any casting or molding process, of course, the hardenable fluid introduced in the recesses 29 and 30 must be caused or allowed to harden before the die blocks 27 and 28 are moved apart.

By properly shaping the grooves 21 of the core pins 13 and 14, threads 11 may be formed of any desired cross sectional configuration.

The maximum height of the vertically oriented surface 20 corresponds, as is evident from FIG. 4, to the pitch of the desired thread 11 to be formed.

What is claimed is:

1. A process for manufacturing a cast or molded internally single threaded nut having upper and lower major surfaces and a plurality of wrench-engaging surfaces extending between said major surfaces, comprising the steps of:

providing first and second contiguous opposed die blocks, each block having a recess therein, said recesses cooperating to converge along a parting line and defining a space having the desired shape of the exterior surface of said nut, said recesses being asymmetrical with respect to said parting line with a larger portion of said space being defined by one of said recesses on one side of said parting line and a smaller portion of said space being defined by the other recess on the opposite side of said parting line;

disposing first and second aligned core pins within said first and second die blocks respectively, each pin having a protruding portion extending into the recess of the corresponding die block, each said protruding portion comprising a helical ramp having an outer diameter and pitch corresponding to the desired diameter and pitch of an internally threaded surface to be formed within said product, said ramp extending through a circumferential angle of less than 360°, said protruding portion including a vertically oriented parting line shut off surface extending between the ends of said ramp, the outer edge of said ramp having a peripheral edge groove therein, said groove extending along the edge of said ramp except in the vicinity of said vertically oriented surface, said ramp having first and second shoulder portions extending between said vertically oriented surface and the ends of said groove, the protruding portions of said core pins being disposed so that the ramps thereof are in abutting relationship with the grooves of said ramps communicating with each other to form a space defining the shape of the internal thread to be formed on said surface;

introducing a hardenable fluid within the spaces between said die blocks and said core pins;

causing said fluid to harden;

separating said first core pin and first die block from said second core pin and second die block; and removing the hardened material from said spaces, said parting line of said die blocks and any corresponding flash on said wrench-engaging surfaces being asymmetrically disposed with respect to said major surfaces of said nut.

2. The process according to claim 1, wherein said fluid is a liquid die casting metal.

3. The process according to claim 1, wherein each of said core pins has a central hole therein substantially perpendicular to the surface of the ramp thereof.

4. The process according to claim 1, wherein said ramps each extend through an angle on the order of 345° to 357°.

5. The process according to claim 1, wherein the width of each of said shoulder portions is at least 0.010 inches.

6. The process according to claim 1, wherein said parting line shutoff surface is disposed at an angle on the order of 5° with respect to the center line of said aligned core pins.

7. An internally cast or molded single threaded nut manufactured by the process of claim 1.

* * * * *